US012034211B2

(12) United States Patent
Duran et al.

(10) Patent No.: US 12,034,211 B2
(45) Date of Patent: Jul. 9, 2024

(54) ARRAY ANTENNA

(71) Applicant: OFFICE NATIONAL D'ETUDES ET DE RECHERCHES AÉROSPATIALES, Palaiseau (FR)

(72) Inventors: Juan Duran, Toulouse (FR); Cédric Martel, Pechabou (FR); Gaëtan Prigent, Colomiers (FR); Olivier Pascal, Frouzins (FR)

(73) Assignee: OFFICE NATIONAL D'ETUDES ET DE RECHERCHES AÉROSPATIALES, Palaiseau (FR)

( * ) Notice: Subject to any disclaimer, the term of this patent is extended or adjusted under 35 U.S.C. 154(b) by 0 days.

(21) Appl. No.: 17/769,271

(22) PCT Filed: Oct. 7, 2020

(86) PCT No.: PCT/FR2020/051764
§ 371 (c)(1),
(2) Date: Apr. 14, 2022

(87) PCT Pub. No.: WO2021/074505
PCT Pub. Date: Apr. 22, 2021

(65) Prior Publication Data
US 2024/0136729 A1 Apr. 25, 2024

(30) Foreign Application Priority Data
Oct. 16, 2019 (FR) ...................................... 1911539

(51) Int. Cl.
*H01Q 1/28* (2006.01)
*H01Q 1/32* (2006.01)
(Continued)

(52) U.S. Cl.
CPC ............... *H01Q 13/26* (2013.01); *H01Q 1/28* (2013.01); *H01Q 1/32* (2013.01); *H01Q 1/34* (2013.01);
(Continued)

(58) Field of Classification Search
CPC ............ H01Q 13/26; H01Q 1/28; H01Q 1/32; H01Q 1/34; H01Q 3/2682; H01Q 21/0075
See application file for complete search history.

(56) References Cited

U.S. PATENT DOCUMENTS

2016/0141754 A1* 5/2016 Leyh ................. H01Q 21/0075 342/372
2017/0062943 A1 3/2017 Patron et al.
2018/0241122 A1* 8/2018 Jalali Mazlouman ... H01Q 3/34

FOREIGN PATENT DOCUMENTS

EP 3 010 086 4/2016

OTHER PUBLICATIONS

Christophe Caloz, et al., "Composite right/left-handed transmission line metamaterials", IEEE Microwave Magazine, IEEESERVICE Center, vol. 5, No. 3, Sep. 1, 2004, pp. 34-50 (17 pages).
(Continued)

*Primary Examiner* — Awat M Salih
(74) *Attorney, Agent, or Firm* — NIXON & VANDERHYE

(57) ABSTRACT

An array antenna is formed from delay lines, and includes radiating elements which are individually connected to line patterns of the delay lines. Such an array antenna structure can be implemented by printed circuit technology and can be used to establish radio links for data communication between a mobile carrier, such as an aircraft, and a geostationary satellite.

20 Claims, 11 Drawing Sheets

(51) Int. Cl.
*H01Q 1/34* (2006.01)
*H01Q 3/26* (2006.01)
*H01Q 13/26* (2006.01)
*H01Q 21/00* (2006.01)

(52) U.S. Cl.
CPC ....... *H01Q 3/2682* (2013.01); *H01Q 21/0075* (2013.01)

(56) References Cited

OTHER PUBLICATIONS

Hemendra Kumar, et al., "A Review on Substrate Integrated Waveguide and its Microstrip Interconnect", IOSR Journal of Electronics and Communication Engineering (IOSR-JECE), ISSN: 2278-2834, ISBN: 2278-8735. vol. 3, Issue 5 (Sep.-Oct. 2012), pp. 36-40 (5 pages).
Hoang V. Nguyen, et al., "Pencil-Beam Full-Space Scanning 2D CRLH Leaky-Wave Antenna Array", IEEE, 2007, pp. 139-142 (4 pages).
Marco Pasian, et al., "A Formula for Radiation Loss in Substrate Integrated Waveguide", IEEE Transactions on Microwave Theory and Techniques, vol. 62, No. 10, Oct. 2014, pp. 2205-2213 (9 pages).
M W Shelley, et al., "Low profile scanning antennas for satcom "on-the-move"", ERA Technology Ltd, 6 pages.
International Search Report and Written Opinion of the ISA for PCT/FR2020/051764 dated Jan. 29, 2021, 15 pages.

* cited by examiner

ARRAY ANTENNA

CROSS-REFERENCE TO RELATED APPLICATIONS

This application is the U.S. national phase of International Application No. PCT/FR2020/051764 filed Oct. 7, 2020 which designated the U.S. and claims priority to French Patent Application No. 1911539 filed Oct. 16, 2019, the entire contents of each of which are hereby incorporated by reference.

BACKGROUND OF THE INVENTION

Field of the Invention

This description relates to an array antenna, which can be particularly suitable for establishing a radio link, in at least one of the Ku and Ka frequency bands, between a mobile carrier and a geostationary satellite.

Description of the Related Art

Communication systems referred to as "SATCOM On-The-Move" make it possible to establish a radio-type communication link between a mobile carrier and a geostationary satellite. The mobile carrier may be a land vehicle, a sea vessel, or an aircraft, in particular an airplane or a drone. For civil applications, such a system can make it possible to provide an Internet connection to the carrier's passengers, including access to messaging services, television services, etc. For military applications, it can provide a continuous communication link between an aircraft and troops on the ground, or between an aircraft and an operational mission control post.

The use of the Ku frequency bands, between 12 GHz (gigahertz) and 18 GHz, and the Ka bands, between 26.5 GHz and 40 GHz, for such systems provides higher communication link throughput compared to other frequency bands previously used. However, the Ku and Ka frequency bands require that the antennas used on board the carriers have sufficiently high gains, in particular gain values which are higher than 30 dBi, where dBi denotes the unit of gain in decibels compared to a reference antenna which radiates uniformly in all spatial directions, or "decibels relative to isotropic".

Moreover, as the carrier equipped with the antenna is mobile, it is necessary that the antenna be able to produce a deflection angle in azimuth of 0° (degrees) to 360°, and a sufficiently significant deflection angle in elevation, for example from 0° to 60°. Such deflections are measured with respect to a reference direction of the antenna which may be intended to be substantially parallel to the vertical direction of the place where the carrier is located, the azimuth relating to a rotation about the reference direction, and elevation being an angle measured from this reference direction within a meridian plane.

In addition, it may be useful for such an antenna to be selective according to the polarization of the radiation emitted or received. To this end, the gain of the antenna must have different values depending on the polarization, with a sufficiently high rejection rate for the polarization orthogonal to that used for a communication link. The relevant radiation polarizations may be, for example, right- and left-handed circular polarizations, or two linear polarizations that are oriented perpendicular to each other.

Finally, for certain applications, the thickness of the antenna is an additional constraint, in particular when the antenna is intended to be fixed on the fuselage of an airplane, in order to reduce airflow interference caused by the antenna. Typically, thicknesses that are less than a few centimeters are required for such applications on board an airplane.

Many types of antennas have already been proposed, including antennas with fully mechanical deflection, antennas with combined deflection, i.e. partly by moving the orientation and partly by variable phase-shifted grating effect, antennas with a two-dimensional array of radiating elements, antennas with an array of reflecting elements, antennas with reconfigurable materials, for example based on ferrites or liquid crystals, etc. But all these antennas only partially satisfy all of the existing constraints, including fragility constraints, in particular when the antenna has moving parts, dimensional constraints, constraints that the gain be high enough, cost constraints, operating temperature constraints, etc.

SUMMARY OF THE INVENTION

Based on this situation, an object of the invention is to propose a new antenna which satisfies at least one of the above constraints to an improved extent, or which provides a trade-off between some of these constraints that is an improvement over existing antennas. In particular, the invention may aim to propose such an antenna which is suitable for providing radio communication links within the Ku and/or Ka frequency band(s), between a mobile carrier and a geostationary satellite.

To achieve at least one of these or other objects, a first aspect of the invention proposes an array antenna which comprises:

at least one row of radiating elements, each radiating element being suitable for individually producing an emission radiation from an electrical excitation signal received by this radiating element;

a control unit acting as a beamformer;

at least one delay line, which is comprised of a serial assembly of line patterns, each line pattern being suitable for retransmitting an electromagnetic signal received at input by this line pattern, with a variable delay to the next line pattern within the delay line, so that the electromagnetic signal constitutes a guided traveling wave which propagates along the delay line from a feed end of this delay line, and each line pattern being provided with at least one control input making it possible to vary the delay produced by this line pattern for the electromagnetic signal; and excitation links, coupling each line pattern of the delay line one-to-one to one of the radiating elements of the row of radiating elements, each excitation link being suitable for transmitting to the corresponding radiating element, as an electrical excitation signal for this radiating element, an electric signal which corresponds to a phase of the guided traveling wave as existing at the line pattern coupled by the excitation link, the row of radiating elements and the delay line coupled to each other in this manner forming an antenna line.

Furthermore, the control unit is suitable for transmitting to the at least one control input of each line pattern an individual command which determines a value of the delay produced by this line pattern for the electromagnetic signal, so that the control unit determines, by means of the individual commands, a direction of emission of radiation by the array antenna.

In the array antenna of the invention, each line pattern comprises at least one delay cell unit, this delay cell unit comprising at least one first capacitor of variable capacitance, and at least one conducting track meander line which is combined with a second capacitor of variable capacitance, in order to produce a variable inductance value. Then, the line pattern is arranged so that the individual command transmitted by the control unit to the control input of this line pattern determines capacitance values of the first and second capacitors.

The antenna proposed by the invention is thus of the array antenna type, in which the direction of transmission or reception is selected by the individual command transmitted by the control unit to each delay line pattern. Therefore the antenna can be without moving parts, and can also be especially thin, in particular with a thickness of a few centimeters or less. Furthermore, an antenna of the invention can be manufactured using known technologies that are reliable and inexpensive, such as printed circuit board (PCB) technologies. In particular, coplanar PCB technology may be used, where a metalized surface which serves as a ground plane is coplanar with metalized portions intended to transmit useful signals. Finally, the absence of reconfigurable materials such as ferrites or liquid crystals, and the absence of moving parts in the antenna, ensure that it is functional within a wide range of temperatures.

Finally, the architecture of the antenna, based on at least one delay line for which the delays produced by the line patterns are variable, implements a simple structure for sending electromagnetic signals to the radiating elements.

According to the invention, the array antenna further comprises a shielding structure arranged near the delay line, so as to at least partially mask radiations that are produced by its line patterns, without significantly masking the emission radiations produced by the radiating elements coupled to the line patterns. Parasitic contributions to the radio signals transmitted by the array antenna, produced by the line patterns of each delay line, are thus reduced. In this manner, the quality of the communication signals transmitted and/or received by the array antenna is superior. For this purpose, each excitation link may extend through an opening in the shielding structure, this opening being located between the line pattern and radiating element which are coupled to each other by the corresponding excitation link.

To obtain a transmission-reception directivity for the array antenna in azimuth and in elevation, the array antenna may comprise several juxtaposed rows of radiating elements so as to form a matrix of radiating elements, each row of radiating elements being associated with at least one delay line dedicated to this row of radiating elements so as to form an antenna line separate from the other antenna lines. In this case, the array antenna further comprises a phase shifter assembly suitable for transmitting a same signal to be emitted to the feed ends of all the delay lines, in accordance with the variable phase shift values individually assigned to the delay lines by the control unit.

In preferred embodiments of the invention, at least one of the following additional features may optionally be reproduced, alone or with several of them combined:

- the delay line may be formed in at least one metalized surface of a printed circuit board, or PCB, in particular by a coplanar printed circuit technology in which an electrical signal carrier track and an electrical ground track are formed in a same metalized surface. In this case, the array antenna thus formed may have a thickness which is less than 10 cm, preferably less than 5 cm, measured perpendicularly to the printed circuit board. Furthermore, particularly robust and compact configurations can be obtained for the array antenna, when the radiating elements connected to the line patterns of the delay line by the excitation links are carried by the same printed circuit board as that of the delay line;
- at least some of the excitation links may each comprise at least one variable coupling element, this variable coupling element having a control input suitable for receiving a coupling intensity signal which is delivered by the control unit. The variable coupling element is then arranged to vary an intensity of the electrical excitation signal as received by the radiating element coupled by the excitation link, with respect to the electromagnetic signal as transmitted in the delay line by the line pattern coupled by the same excitation link;
- each line pattern may comprise several delay cell units, for example four delay cell units, which are assembled in series. Then, the excitation link coupled to this line pattern may be electrically connected to the delay line between two successive delay cell units in the line pattern, or between the last of the delay cell units of the line pattern and the first of the delay cell units of the next line pattern in the delay line;
- each radiating element may comprise at least one surface element, also called a "pad", which is metalized or metallic, and which is coupled by an uninterrupted electrical connection or remotely coupled by electromagnetic interaction to the corresponding line pattern, so as to form the excitation link between this radiating element and this line pattern. Optionally, each radiating element may comprise several metalized or metallic surface elements which are superimposed and all coupled to the excitation line of this radiating element, and which have different dimensions so as to produce maximal radiation emission efficiencies for frequency values of the radiation which differ between at least two of the surface elements of a same radiating element;
- a same row of radiating elements may be associated with two delay lines, so that each radiating element of the row of radiating elements is coupled to receive a first electrical excitation signal from a line pattern which belongs to a first of the two delay lines, and simultaneously to receive a second electrical excitation signal from another line pattern which belongs to the other of the two delay lines. Thus, a phase difference between the first and second electrical excitation signals received by a same radiating element determines a polarization of the emission radiation produced by this radiating element;
- a pitch length of the radiating elements, measured between any two neighboring radiating elements within the array antenna, may be less than or equal to the smallest wavelength value within a transmission band of the array antenna, divided by the term $1+\sin(\theta_{max}))$ where $\theta_{max}$ is the maximum value of the elevation angle of the antenna pointing. The radio transmission signal produced by the array antenna then has good homogeneity, without grating lobes resulting from spectral aliasing; and
- each delay line may extend between its feed end and a terminal end of the delay line, the feed end being provided with an impedance matching cell, and the terminal end being provided with a termination cell which has an impedance value substantially equal to an impedance value characteristic of the delay line. In this case, and when a printed circuit technology is used to manufacture the array antenna, the impedance matching cell and the termination cell of each delay line can be formed in the same metalized surface of the circuit board as the line patterns of this delay line.

Finally, a second aspect of the invention relates to a vehicle which comprises an array antenna that is in accordance with the first aspect of the invention, this array antenna being installed on board the vehicle. Such a vehicle may be, in particular, a land vehicle, a ship or an aircraft, in particular an airplane, helicopter or drone, including a fixed-wing drone or a multicopter-type drone.

BRIEF DESCRIPTION OF THE DRAWINGS

The features and advantages of the invention will become more clear in the following detailed description of some non-limiting embodiments, with reference to the appended figures, in which.

DESCRIPTION OF THE PREFERRED EMBODIMENTS

For clarity sake, the dimensions of the elements represented in these figures correspond neither to actual dimensions nor to actual dimensional ratios. Furthermore, some of these elements are only represented symbolically, and identical references indicated in different figures designate elements which are identical or have identical functions.

The invention is now described with reference to an embodiment implemented in coplanar printed circuit board technology, it being understood that printed circuit microstrip technology may also be used. Although the use of such printed circuit technologies is particularly suitable and economical, alternatively other manufacturing technologies may still be used.

The array antenna of the invention, designated by the reference 100, is formed from at least one, but preferably several antenna lines which are juxtaposed parallel to each other inside a plane of the antenna. Each antenna line is formed from a delay line, the latter consisting of a rectilinear chain of line patterns, all identical within the same delay line and also identical across all the antenna lines. The line patterns are arranged within the antenna plane in a two-dimensional matrix, preferably square, in which one direction is the lengthwise direction of the antenna lines, and the other direction is that of the juxtaposition of the antenna lines.

Figure 1:
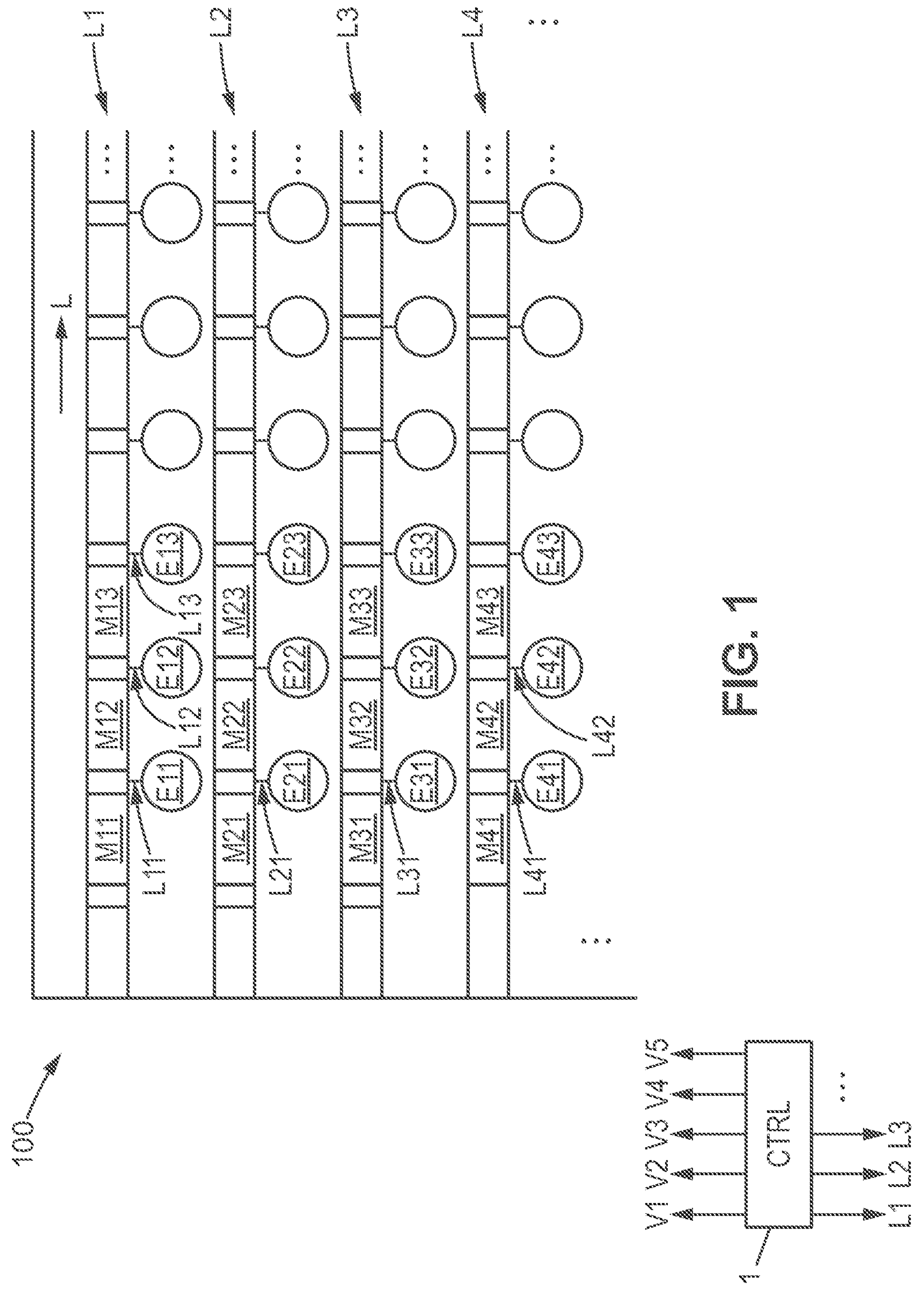
FIG. 1 is a simplified plan view of an array antenna according to the invention.

FIG. 1 is a plan view of such an array antenna structure according to the invention. In this figure, L1, L2, L3 and L4 designate four delay lines which are adjacent in the array antenna 100; M11, M12 and M13 designate three first successive line patterns of delay line L1; M21, M22 and M23 designate three first successive line patterns of delay line L2; M31, M32 and M33 designate three first successive line patterns of delay line L3; and M41, M42 and M43 designate three first successive line patterns of delay line L4. For example, each delay line may contain 41 line patterns, and the array antenna 100 may contain 42 delay lines.

Each delay line is associated with a row of radiating elements to form an antenna line, with a separate radiating element being associated with each line pattern of the delay line. Thus, in general, radiating element Eij is supplied with an excitation signal from line pattern Mij, where i is an integer index which identifies the delay line, i.e. Li, and j is another integer index which is equal to the sequential order number of line pattern Mij within delay line Li. An excitation link Lij then connects an output side of line pattern Mij to radiating element Eij, in order to transmit to the latter the excitation signal coming from line pattern Mij. All radiating elements Eij may be identical to each other, as well as all excitation links Lij.

We will now describe possible embodiments for the array antenna 100 components which have just been introduced: a possible line pattern structure, several possible radiating element models, then two possible excitation link models.

Figure 2:
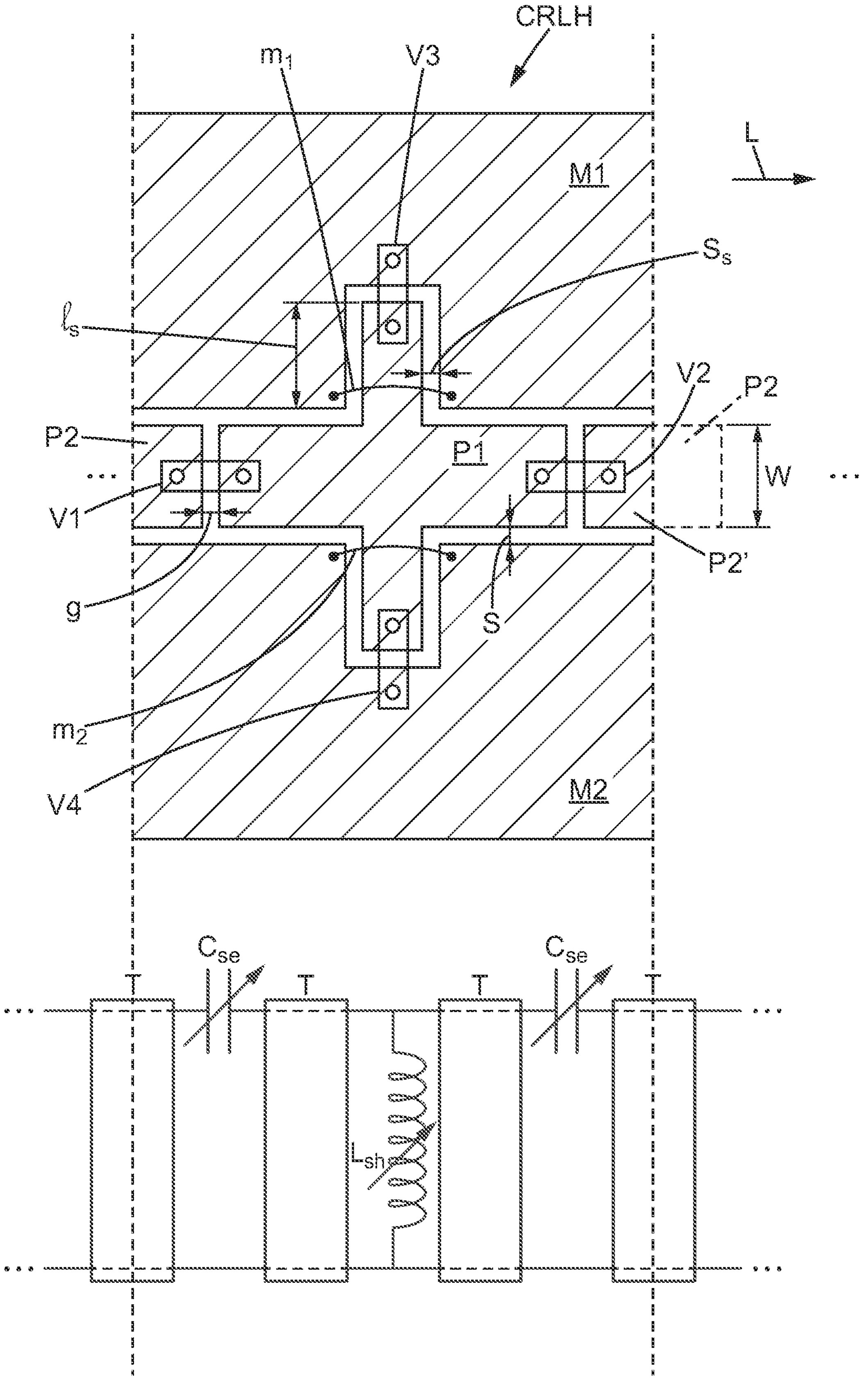
FIG. 2 is a plan view of a delay cell unit which can be used in an array antenna according to the invention, with the electrical diagram which is equivalent to this cell.

The upper part of [FIG. 2] shows a delay cell unit, and the lower part of the same figure shows the circuit diagram which is equivalent to this delay cell unit. On a substrate of coplanar printed circuit technology, M1 and M2 designate two metalized portions electrically connected to each other and to an electrical ground of the array antenna 100. Portions M1 and M2 are arranged on opposite sides of metalized portions P1, P2, and P2', while being electrically insulated therefrom. Portions P1, P2, and P2' are intended to transmit an electromagnetic signal between the left and right edges of [FIG. 2], while applying a transmission delay to this signal. Thus, the electromagnetic signal propagates along the delay line formed by the chaining of the delay cell units. Portion P2' which is at the right edge of the delay cell unit represented extends continuously into portion P2 which is at the left edge of the next delay cell unit along line direction L. Alternatively, portion P2' extends continuously to the left edge of a segment of the delay line which is dedicated to connecting one of the excitation links to the output of the delay cell unit represented.

In a known manner, the insulating gaps between portions M1, M2 on the one hand and portions P1, P2 on the other hand, as well as the insulating gap between portions P1 and P2, in the same manner as that between portions P1 and P2', with the shape of these intervals, determine the electrical characteristics of the delay cell unit, and consequently the value of the delay produced by this delay cell unit when it transmits the electromagnetic signal from its left edge to its right edge. More precisely, the width S of the insulating gap between each of portions P1 and P2 on the one hand and each of portions M1 and M2 on the other hand, and the track width W, determine the characteristic impedance of transmission line segments T of the delay cell unit. The corresponding lengths of insulating gaps between portions M1/M2 and P1/P2, or P1/P2', determine the phase variations to be produced in an equivalent manner by the transmission line segments T, and consequently the length values to be attributed to these segments T. Furthermore, the width g of the insulating gaps between portions P1 and P2/P2', as well as their length W, determine the capacitance values $C_{se}$. In addition, the meander length $l_s$ of portion P1 protruding into portions M1, M2, and the width $S_s$ of the insulating gap in these meanders, determine an inductance value $L_{sh}$. The short-circuiting connections m1 and m2 ensure continuity in the function of the electrical ground to the metalized portions M1 and M2 through the meanders which establish the inductance $L_{sh}$. To make the values of the capacitors $C_{se}$ variable and controllable, varactors V1 and V2 may be arranged to create bridges between portions P1 and P2/P2'. Similarly, varactors V3 and V4 allow the value of the inductance $L_{sh}$ to be variable and controllable. Since the operation of varactor components is well known, their connections and control devices are not represented. Typically, the value of the capacitors $C_{se}$ of a delay cell unit constructed in this manner can be varied between 0.3 pF (picofarad) and 1.2 pF by a control unit 1, denoted CTRL in [FIG. 1], and the inductance of value $L_{sh}$ can be varied between 0.11 nH (nanohenry) and 0.33 nH by the control unit 1. In the electric diagram equivalent to the delay cell unit just described, the transmission line segments T, the capacitors of value $C_{se}$, and the inductance of value $L_{sh}$ are electrically connected as shown in the lower part of [FIG. 2]. In the literature, such a delay cell unit is commonly called a CRLH cell, for "Composite Right/Left-Handed" cell. Its electrical principle of operation is very well known, so it is not necessary to describe it further here. The length of each CRLH cell along direction L may be 2.7 mm (millimeter), for example.

To obtain an amplitude of variation of +/−60° for the transmission direction of the array antenna 100, in a plane which contains direction L and which is perpendicular to the plane of the antenna, for a frequency of the emitted radiation which is equal to 14 GHz in the Ku band, the maximum delay required between the excitation signals transmitted to two successive radiating elements Eij and Ei j+1 can be obtained from four CRLH cells as described above. These four delay cell units are arranged in series within the delay line Li, to form line pattern Mij as considered above. Such a line pattern Mij which is composed of several delay cell units can also be called a macrocell of the delay line. One of the delay cell units of each line pattern is coupled to a radiating element via the excitation line dedicated to that line pattern. The length of each line pattern of four CRLH cells, along direction L, is then 4×2.7 mm=10.8 mm. A homogeneity condition of each delay line is that the length of each delay cell unit in this delay line is less than one-fourth of the wavelength of the emitted radiation. Such a condition is satisfied for the numerical values of the example described, the wavelength associated with the frequency of 14 GHz being equal to 21.4 mm.

Figure 3A:
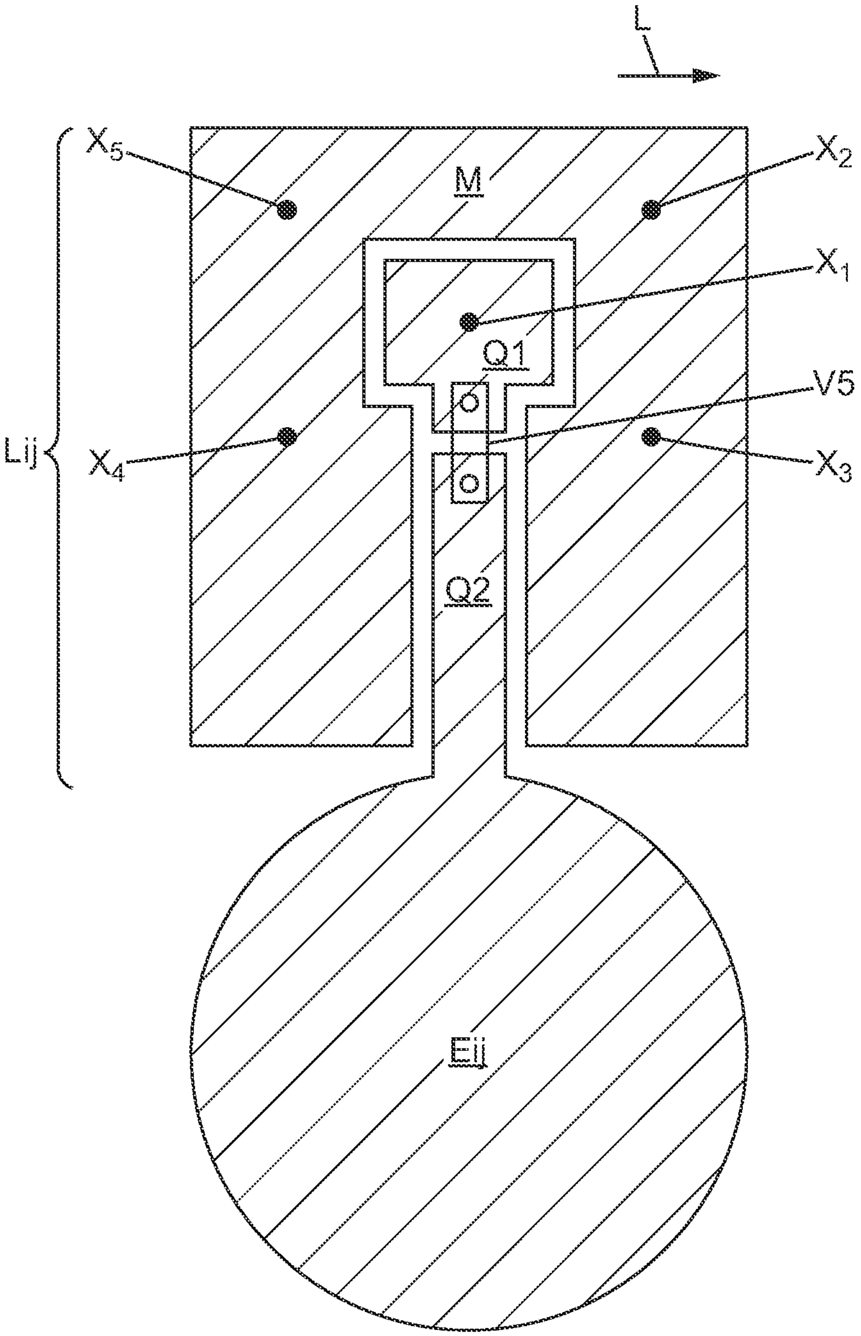
FIG. 3*a* is a plan view of one possible embodiment of an excitation link and a radiating element, intended to be coupled to a delay cell unit according to [FIG. 2]

FIG. 3*a* shows another printed circuit of coplanar technology, which constitutes the radiating element Eij and the excitation link Lij. In a simple embodiment of the radiating element Eij, the latter may consist of a metalized pad, for example in the form of a disc 3 mm in diameter. In general, the diameter of the metalized pad can be between $0.25 \cdot \lambda/n$ and $0.50 \cdot \lambda/n$, where λ denotes the wavelength of the emitted radiation, and n is the refractive index of the dielectric material of the printed circuit. If the frequency of the emitted radiation is 14 GHz, and the value of the refractive index n of the dielectric material is equal to $6.15^{1/2}$, then the value of 3 mm for the diameter of the metalized pad corresponds to $0.347 \cdot \lambda/n$. Alternatively, the metalized pad may also be in the shape of a square, for example 3 mm per side again for the value of 14 GHz for the frequency of the radiation emitted. The metalized portions Q1 and Q2 are arranged in series, portion Q2 being between portion Q1 and radiating element Eij and continuous with the latter, to constitute the excitation link Lij. The metalized portion M laterally surrounds portions Q1 and Q2. A printed circuit of the type illustrated by [FIG. 3*a*] is then intended to be fixed to the printed circuit of the delay line, between two successive delay cell units, by electrically conducting connections $X_1$-$X_5$, selectively after the one among the delay cell units whose electromagnetic signal is intended to be transmitted to the radiating element concerned. For example, the two printed circuits of [FIG. 2] and [FIG. 3*a*] can be rotated in the same direction, so that the substrate of the printed circuit of [FIG. 3*a*] is between its metalized portions and those of the printed circuit of [FIG. 2]. Then the conducting connection $X_1$ connects metalized portion Q1 to metalized portion P2'. Simultaneously, conducting connections $X_2$ and $X_5$ connect metalized portion M to metalized portion M1, and conducting connections $X_3$ and $X_4$ connect metalized portion M to metalized portion M2. Another varactor, denoted by V5, can connect metalized portions Q1 and Q2 together within excitation link Lij in order to adjust the amplitude of the excitation signal transmitted from line pattern Mij to radiating element Eij. Each varactor V5 has an appropriate control device, and is connected such that its capacitance value is adjusted by the control unit 1.

Figure 4:
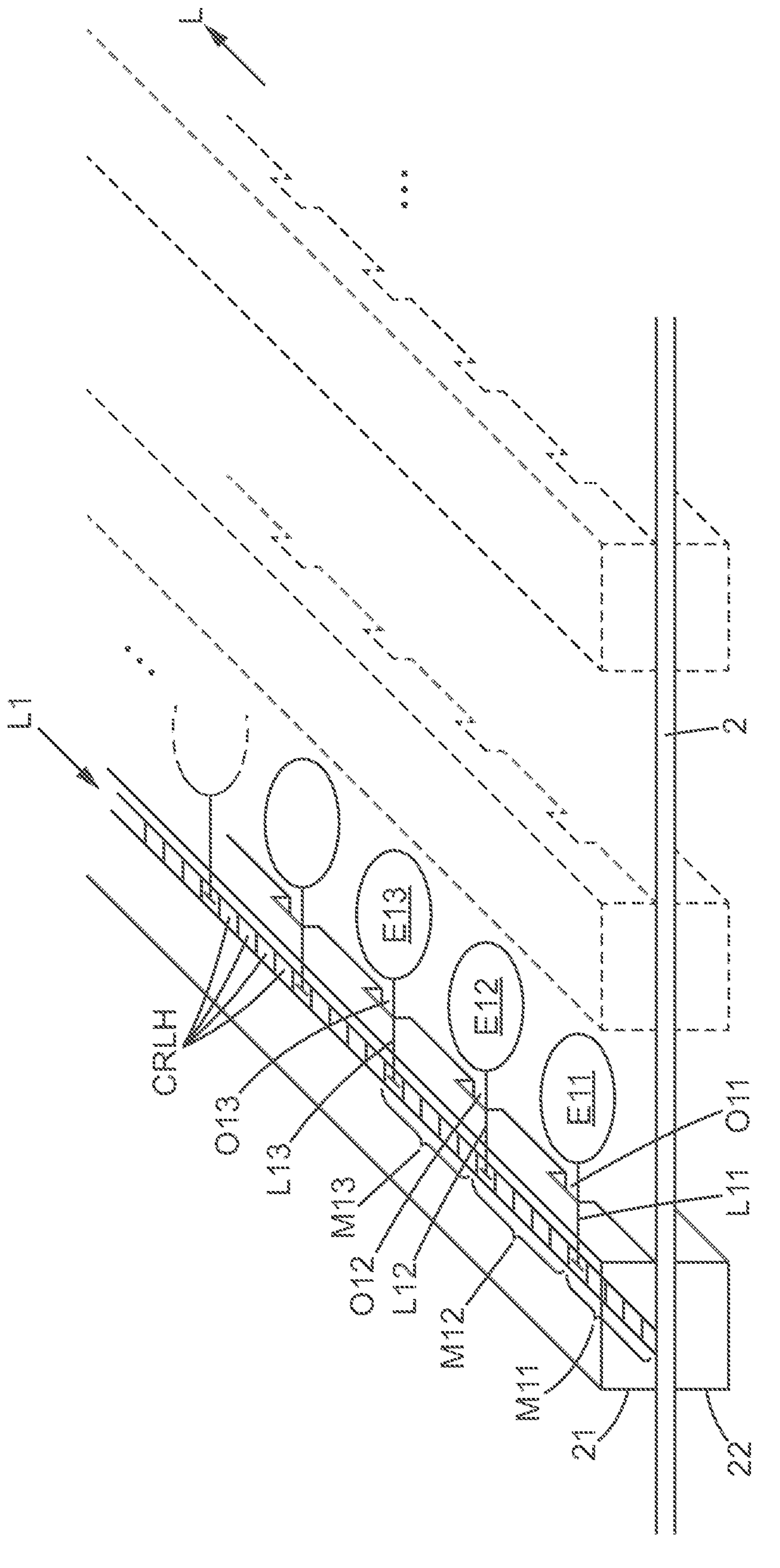
FIG. 4 is a perspective view of an antenna line forming part of an array antenna according to [FIG. 1]-[FIG. 3*b*]

FIG. 4 schematically shows the antenna line which is thus formed from the delay line L1. The reference 2 designates the dielectric substrate of the printed circuit in which the line patterns are formed, for example in the manner illustrated by [FIG. 1] and where each line pattern consists of four CRLH cells and one segment connecting to an excitation link. Line patterns M11, M12, and M13 are shown, with associated radiating elements E11, E12, and E13. A strip of the printed circuit which contains delay line L1 may be enclosed in an electrically conducting casing, to screen against radiation the delay line L1 could emit. For example, the conducting casing of delay line L1 may be composed of two casing parts, casing part 21 which is arranged on the substrate 2, and casing part 22 which is arranged under the substrate 2 and in alignment with casing part 21. The radiating elements are located outside these casing parts 21 and 22, such that the radiation emitted by these radiating elements is not masked. The casing parts 21 and 22 thus form a shielding structure which is selectively effective for delay line L1. Openings may be provided in the casing part 21, specifically so that the shielding structure does not interfere with the electrical operation of the excitation links: opening O11 is dedicated to excitation link L11, opening O12 to excitation link L12, opening O13 to excitation link L13, etc. The casing parts 21 and 22 may advantageously be electrically connected to the electrical ground of the array antenna 100, and in particular casing part 21 may be in direct contact with the metalized portions M1, M2, and M. Possibly, the casing parts 21 and 22 may be made of copper, and also may be created from printed circuits. In this case, additional printed circuit substrates dedicated to the casing parts 21 and 22 may be arranged one on either side of the substrate 2, forming a compact stack. Metalized strips may in particular form the surfaces of the casing parts 21 and 22 which are parallel to the substrates, and metal pads arranged through the substrates may serve as surfaces oriented perpendicularly to the substrates for the casing parts 21 and 22. The outlines indicated in dashed lines in [FIG. 4] show the locations of the shielding structures dedicated to delay lines L2 and L3.

Figure 3B:
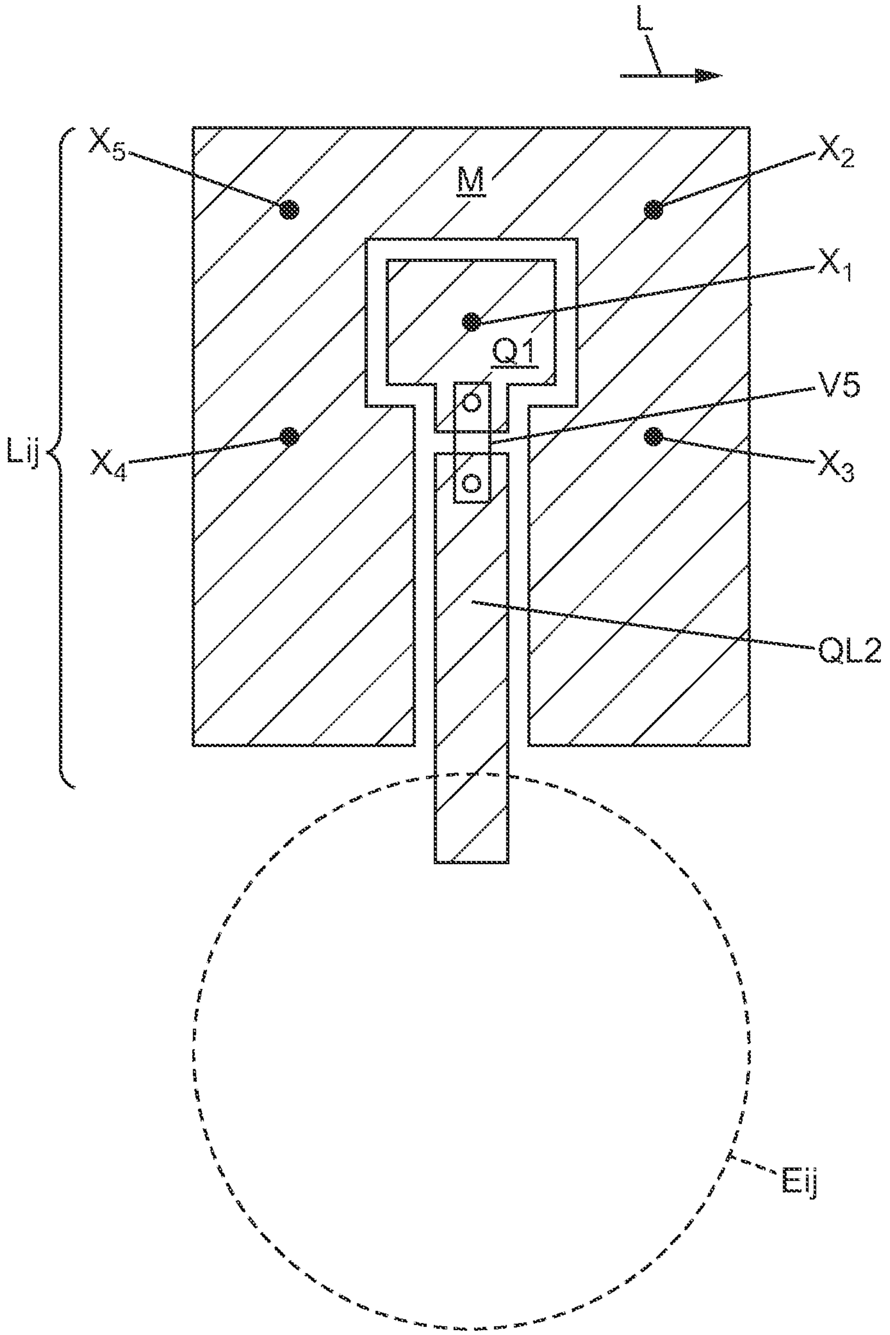
FIG. 3*b* corresponds to [FIG. 3*a*] for an alternative embodiment.

For an alternative embodiment of the excitation links Lij and radiating elements Eij, the latter may be implemented in the form of metalized pads which are located on the same face of the printed circuit substrate 2 as the line patterns Mij of the delay lines Li. These pads are aligned in direction L, with a line of pads between two adjacent delay lines Li. The pads are electrically insulated from each other, and electrically insulated from all metalized portions constituting the delay lines (P1 and P2/P2' in [FIG. 2]) as well as from the metalized portions of the electrical ground (M1 and M2 in [FIG. 2]). [FIG. 3*b*] shows one possible adaptation of the excitation link Lij, which is appropriate when the radiating elements Eij are thus composed of insulated metalized pads carried by the substrate 2. Metalized portion Q2 of FIG. 3*a* can be extended in the form of a metalized line QL2, until it projects beyond the edge of the metalized pad of radiating element Eij. The previously described assembly of the substrate of [FIG. 2] with that of [FIG. 3*a*] can be applied for the substrate of [FIG. 3*b*], such that metalized line QL2 remotely influences the pad of radiating element Eij by electromagnetic interaction through the substrate of the printed circuit of excitation link Lij (the one in [FIG. 3*b*]). The position of the pad of radiating element Eij relative to metalized line QL2, as effective when the substrates are assembled by connections $X_1$-$X_5$, is indicated with dotted lines in [FIG. 3*b*].

Other embodiments may be used to create the excitation links Eij. In particular, each metalized portion Q1 may be connected to one of metalized portions P1 or P2/P2' via an electrical connection which passes through the printed circuit substrate 2, or via a wired electrical connection and a metalized track which are added to pass above the metalized portions M1 and M2. Such connection modes are commonly referred to as "back biased circuit" and "top biased circuit", respectively.

Figure 5:
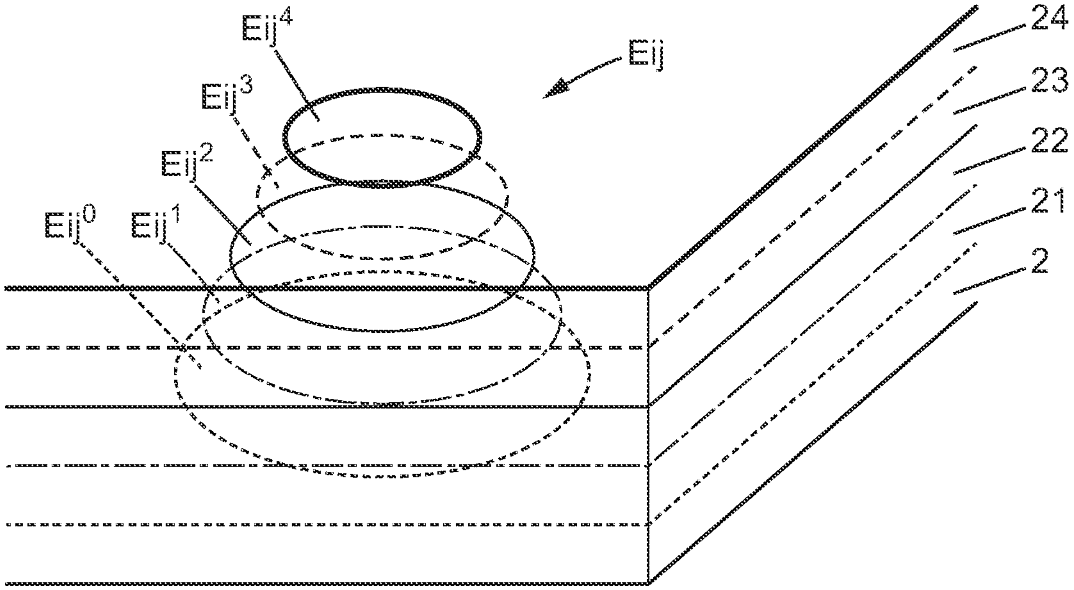
FIG. 5 is a perspective view of a composite radiating element that can be used in the array antenna of [FIG. 1]

Possibly, each radiating element Eij may be composed of several metalized pads of different sizes, for example five pads $Eij^0$ to $Eij^4$, which are superimposed onto the one among them which forms the base metalized pad, as shown in [FIG. 5]. All the metalized pads of each radiating element Eij can be electrically isolated from each other. The base pad, $Eij^0$, may be coupled by excitation link Lij to line pattern Mij in any of the ways illustrated in [FIG. 3*a*] and [FIG. 3*b*]. The upper pads, $Eij^1$ to $Eij^4$ in the example shown, may be supplied with an excitation signal remotely, from the base pad $Eij^0$, by electromagnetic interaction. The various pads of the same radiating element Eij each have different resonance frequencies due to their different respective sizes, so that each composite radiating element thus formed can be effective for transmitting within an expanded frequency band. For example, each pad may be created on the surface of a different printed circuit substrate, and all the substrates are stacked on top of each other so that the pads are superimposed in the direction perpendicular to the substrates. Such stacks dedicated to forming the radiating elements Eij may be housed between the casing parts 21 dedicated to neighboring delay lines Li. For the example illustrated by [FIG. 5], pad $Eij^0$ is disc-shaped and carried by substrate 2; pad $Eij^1$, also disc-shaped, is carried by substrate 21; pad $Eij^2$, again disc-shaped, is carried by substrate 22; pad $Eij^1$, again disc-shaped, is carried by substrate 23, and finally pad $Eij^4$, again disc-shaped, is carried by substrate 24. The respective diameters of all these pads $Eij^0$-$Eij^4$ may be between $0.25 \cdot \lambda/n$ and $0.50 \cdot \lambda/n$. In [FIG. 5], each metalized pad and the edge of the one of the printed circuit surfaces in which it is located are represented with lines of the same type.

Figure 6A:
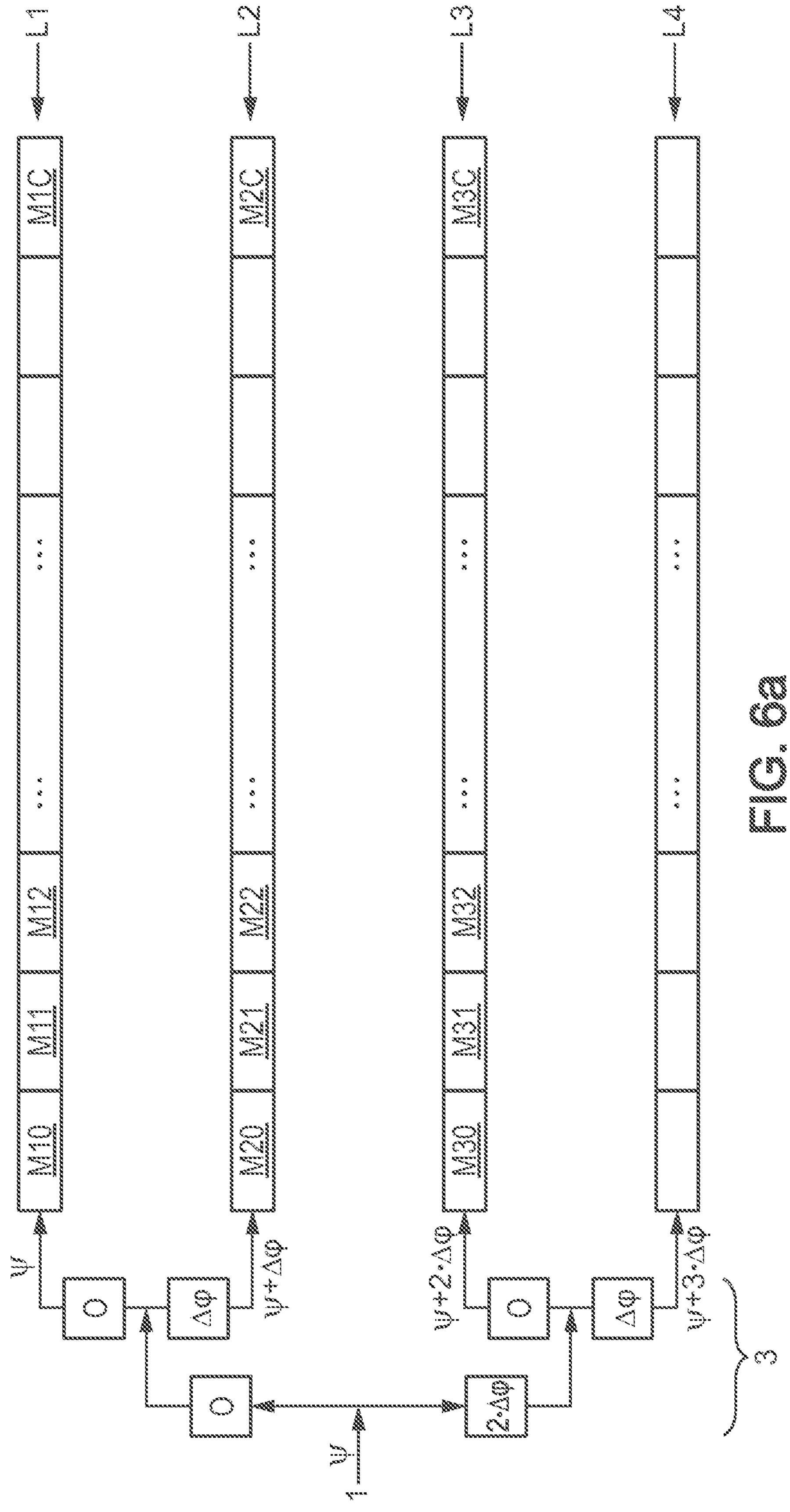
FIG. 6*a* shows a possible connection mode for supplying the electromagnetic signal to the delay lines of an array antenna according to the invention.
Figure 6B:
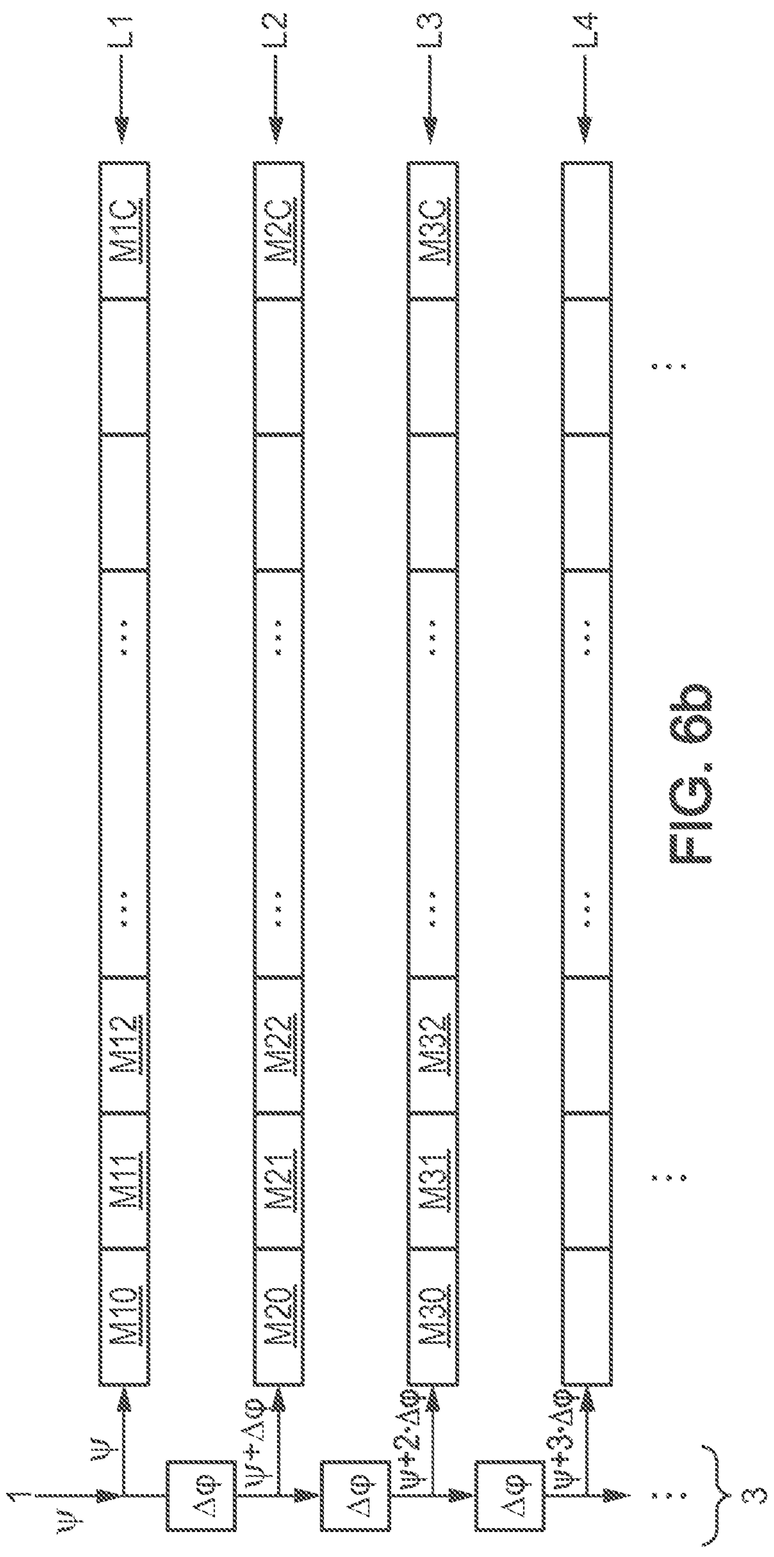
FIG. 6*b* shows another possible connection mode for supplying the electromagnetic signal to the delay lines of an array antenna according to the invention.

FIG. 6*a* and [FIG. 6*b*] show two possible architectures for the feeding of the delay lines by the control unit 1. A feed end of each delay line is connected by a phase shifter assembly 3 to a signal output of the control unit 1. In both figures, ψ denotes the phase of the electromagnetic signal as it reaches the input of this phase shifter assembly 3. [FIG. 6*a*] corresponds to a parallel-type architecture for the phase shifter assembly 3, in order to apply an identical phase shift $\Delta\varphi$ between any two neighboring delay lines Li in the array antenna 100. In a known manner, the phase shift value $\Delta\varphi$ determines the deflection of the radiation emitted by the array antenna 100 in a plane perpendicular to the rows of radiating elements. For simplicity, [FIG. 6*a*] is presented for four neighboring delay lines, but those skilled in the art know how to generalize the parallel architecture of phase shifters as shown in this figure to the actual number of antenna lines of the array antenna 100. The terms 0, $\Delta\varphi$, and $2 \cdot \Delta\varphi$ designate phase shifters which are controlled to apply delays respectively equal to 0, $\Delta\varphi$, and $2 \cdot \Delta\varphi$ to the portion of the signal which they each transmit. [FIG. 6*b*] corresponds to [FIG. 6*a*], replacing the parallel architecture of the phase shifter assembly 3 with a serial architecture. In addition, to allow efficient transmission of the signal between the phase shifters and the delay lines, each delay line Li may be provided at its feed end with an impedance matching cell denoted Mi0, for i=1, 2, 3, . . . . The use of such an impedance matching cell is known to those skilled in the art, so it is not necessary to repeat the principle here. Advantageously, each impedance matching cell Mi0 may be made with the same technology as is used for the line patterns Mij, but by appropriately adapting the electrical parameters of this cell Mi0 to those of the line patterns Mij. For example, for each delay line Li, the impedance matching cell Mi0 and all the line patterns Mij, $j \approx 0$, may be created simultaneously on a single printed circuit substrate. Possibly, the impedance matching cell Mi0 may have a structure of the same type as CRLH cells, but with different dimensions of the metalized portions and different widths of the gaps between these portions.

Finally, to avoid interference with the radio signal emitted by the array antenna 100, caused by reflection of the electromagnetic signal transmitted along each delay line at its end opposite to its feed end, each delay line Li may be terminated by an end cell MiC. In a known manner, this end cell MiC is adapted to have an input impedance which is equal to the characteristic impedance of the chain of line patterns Mij. As with the impedance matching cells Mi0, the end cells MiC may advantageously be made with the same technology as used for the line patterns Mij, but appropriately adapting the electrical parameters of this cell MiC to those of the line patterns Mij.

Figure 7A:
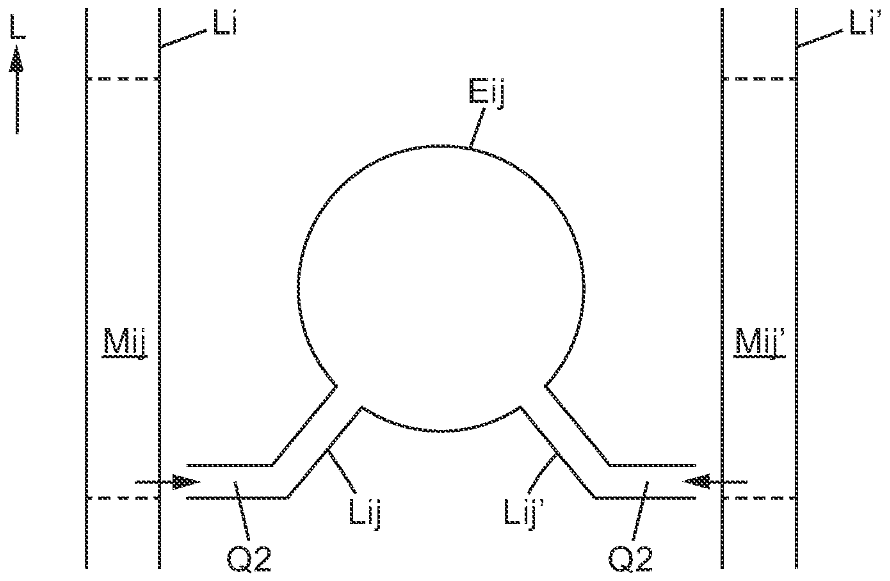
FIG. 7*a* shows another configuration which can be used for the array antenna of [FIG. 1], in order to obtain a radiation emission which is selective according to the polarization, for the excitation link embodiment of [FIG. 3*a*]
Figure 7B:
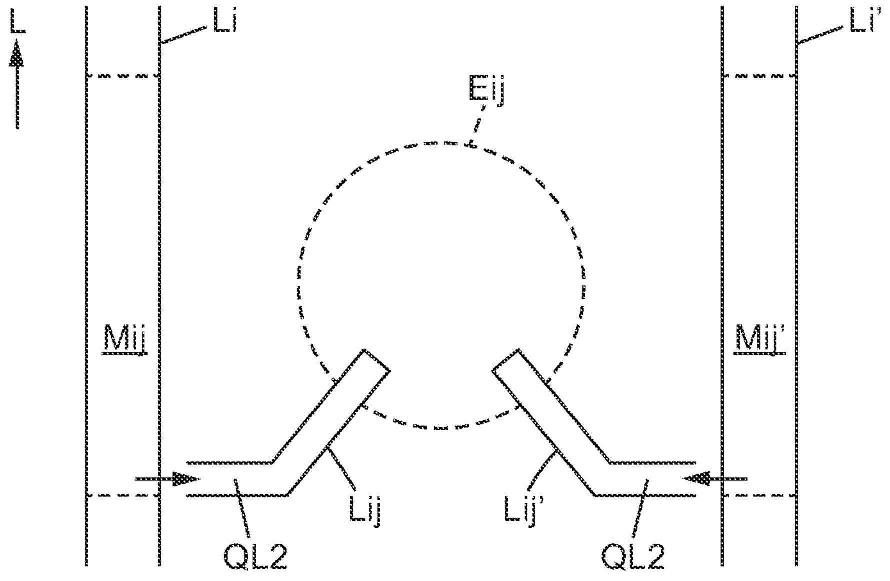
FIG. 7*b* corresponds to [FIG. 7*a*], for the excitation link embodiment of [FIG. 3*b*]

The embodiments of [FIG. 7*a*] and [FIG. 7*b*] make it possible to emit and detect radiation selectively with respect to a left-handed circular or right-handed circular polarization of this radiation. To this purpose, each antenna line is composed of two delay lines associated with the same row of radiating elements. Thus, the radiating elements Eij are simultaneously supplied an excitation signal from the two delay lines Li and Li'. For the embodiment of [FIG. 7*a*], each radiating element Eij is connected to line pattern Mij of delay line Li by excitation link Lij, and also connected to line pattern Mij' of delay line Li' by excitation link Lij'. Radiating element Eij may be composed of at least one disc-shaped metalized pad, and excitation links Lij and Lij' reach the circumference of the disc at two locations which are angularly separated relative to the center of the disc. Then, excitation signals respectively transmitted by excitation links Lij and Lij', and which are identical while being out of phase by an angle controlled by the control unit 1, cause radiation to be emitted which is distributed between the two circular polarizations, left-handed and right-handed. In particular, it is possible to produce the radiation exclusively with left- or right-handed circular polarization, when the phase shift angle is equal to the angle between excitation links Lij and Lij' at the edge of the disc of radiating element Eij, or equal to the opposite of this angle. Indeed, the phase shift angle which is controlled by the control unit 1 is applied between the signals transmitted to delay lines Li and Li', at the feed ends thereof. These delay lines Li and Li' may be arranged one on either side of the row of radiating elements Eij, as shown in [FIG. 7*a*] and [FIG. 7*b*]. Alternatively, they may be superimposed one on top of the other on the same side of the row of radiating elements Eij. In both cases, the delay lines Li and Li' are preferably housed separately in respective shielding structures. [FIG. 7*b*] is equivalent to [FIG. 7*a*], for the excitation link embodiment of [FIG. 3*b*].

Figure 8:
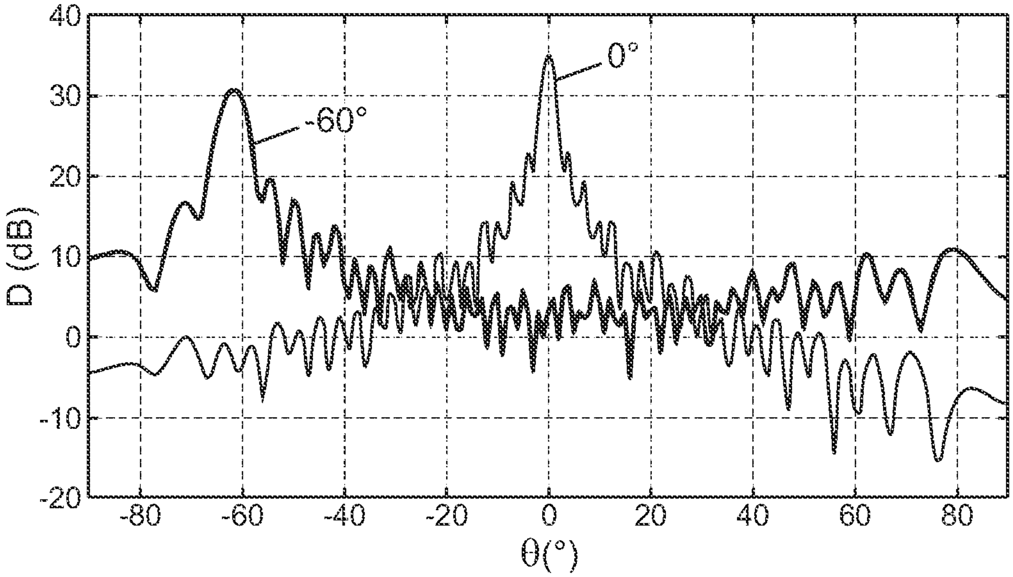
FIG. 8 is a radiation pattern obtained for an array antenna according to the invention.

FIG. 8 is a diagram which shows the variations in the power density radiated by the array antenna 100 in a meridian plane, for two elevation values of the transmission-reception direction: 0° (thin curve) and −60° (thick curve). The horizontal axis indicates the values of the elevation angle, denoted θ and measured relative to the direction perpendicular to the antenna plane, and the vertical axis indicates the values of the radiated power density, denoted D and expressed in dB (decibels). The two curves show that a directivity value of at least 33 dBi is obtained in each case. In a known manner, directivity is defined as the maximal value of the emission power density per unit of solid angle, corresponding to the aiming direction of the array antenna 100, divided by the average value of this emission power density over the entire solid angle range, i.e. over 4.7c steradians.

Figure 9:
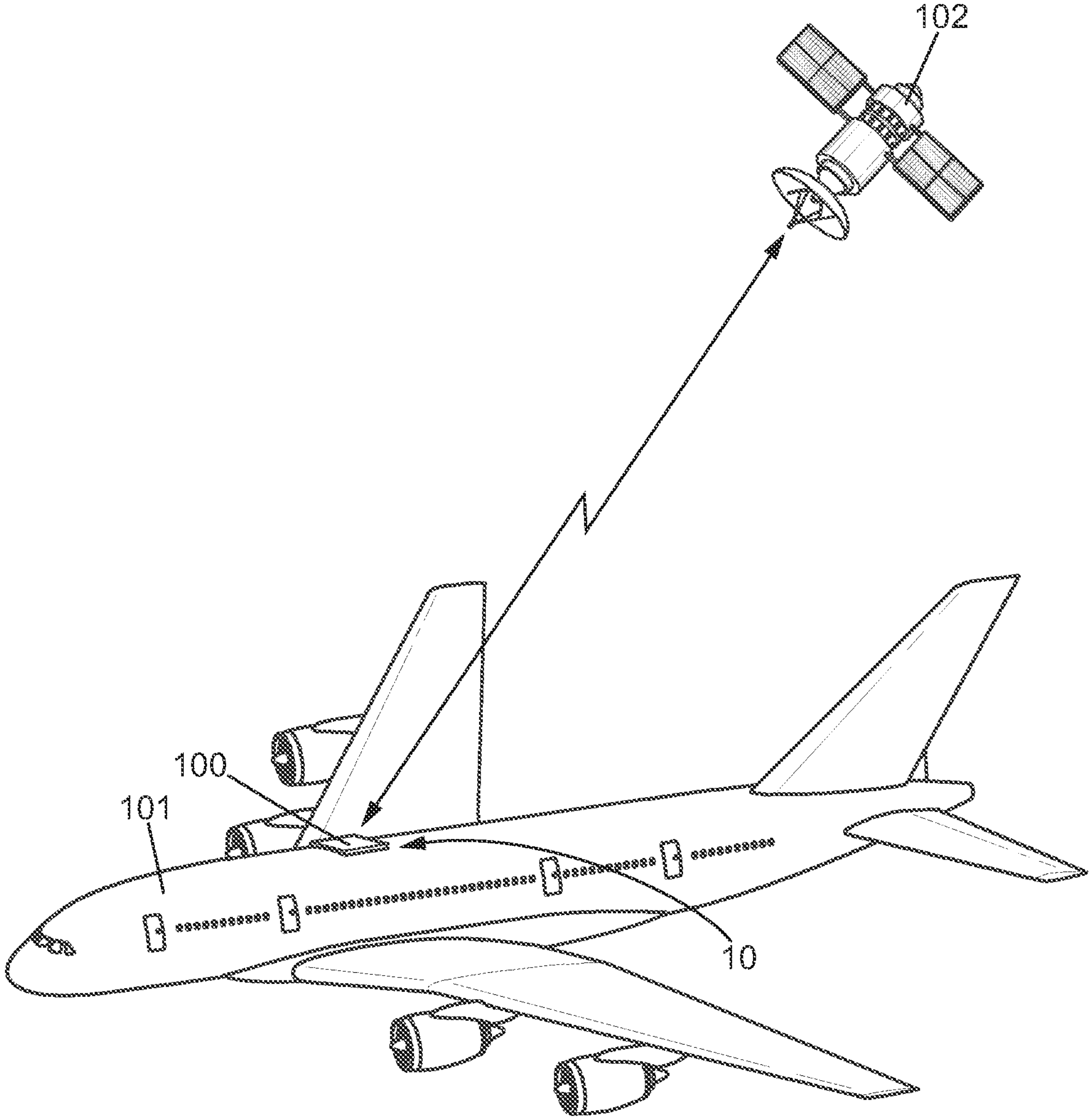
FIG. 9 illustrates a possible use of an array antenna according to the invention.

Finally, [FIG. 9] shows the array antenna 100 fixed to the fuselage of an airplane 101, with the printed circuit substrate 2 parallel to the outer surface of the fuselage at the location of the array antenna 100. The array antenna 100 can then be used for data links between the airplane 101 and a radio communication satellite 102, in particular in order to establish Internet communication links. In particular, such a data link can be compliant with the communication system known as “SATCOM On-The-Move”.

It is understood that the invention may be reproduced by modifying secondary aspects of the embodiments described in detail above, while retaining at least some of the advantages cited. In particular, the alternative embodiments described for certain components of an array antenna according to the invention may be combined together between different components in multiple ways. In addition, any cited numerical values are for illustrative purposes only, and may be changed according to the application considered. In particular, they may easily be adapted to an operation of the antenna within the Ka frequency band.

The invention claimed is:

1. An array antenna comprising:

at least one row of radiating elements, each radiating element being suitable for individually producing emission radiation from an electrical excitation signal received by said radiating element;

a control unit acting as a beamformer;

at least one delay line, which is comprised of a serial assembly of line patterns, each line pattern being suitable for retransmitting an electromagnetic signal received at input by said line pattern, with a variable delay to the next line pattern within the delay line, so that the electromagnetic signal constitutes a guided traveling wave which propagates along the delay line from a feed end of said delay line, and each line pattern being provided with at least one control input making it possible to vary the delay produced by said line pattern for the electromagnetic signal; and excitation links, coupling each line pattern of the delay line one-to-one to one of the radiating elements of the row of radiating elements, each excitation link being suitable for transmitting to the corresponding radiating element, as an electrical excitation signal for said radiating element, an electrical signal which corresponds to a phase of the guided traveling wave as existing at the line pattern coupled by said excitation link, the row of radiating elements and the delay line thus coupled to each other forming an antenna line, the control unit being suitable for transmitting to the at least one control input of each line pattern, an individual command which determines a value of the delay produced by said line pattern for the electromagnetic signal, so that the control unit determines, by means of the individual commands, a direction of emission of radiation by the array antenna, wherein each line pattern comprises at least one delay cell unit, said delay cell unit comprising at least one first capacitor of variable capacitance, and at least one conductor track meander line which is combined with a second capacitor of variable capacitance, in order to produce a variable inductance value, and said line pattern is arranged so that the individual command transmitted by the control unit to the control input of said line pattern determines capacitance values of said first and second capacitors, wherein the array antenna further comprises a shielding structure arranged near the delay line, so as to at least partially mask radiations produced by the line patterns of said delay line, without significantly masking the emission radiations produced by the radiating elements coupled to said line patterns.

2. The array antenna of claim 1, wherein each excitation link extends through an opening in the shielding structure, said opening being located between the line pattern and the radiating element which are coupled to each other by said excitation link.

3. The array antenna of claim 2, wherein the delay line is formed in at least one metalized surface of a printed circuit board.

4. The array antenna of claim 2, wherein at least some of the excitation links each comprise at least one variable coupling element, said variable coupling element having a control input suitable for receiving a coupling intensity signal which is delivered by the control unit, and being arranged to vary an intensity of the electrical excitation signal as received by the radiating element coupled by said excitation link, with respect to the electromagnetic signal as transmitted in the delay line by the line pattern coupled by the same excitation link.

5. The array antenna of claim 2, wherein each radiating element comprises at least one metalized or metallic surface element, which is coupled by an uninterrupted electrical connection or remotely coupled by electromagnetic interaction to the corresponding line pattern, so as to form the excitation link between said radiating element and said line pattern.

6. The array antenna of claim 1, wherein the delay line is formed in at least one metalized surface of a printed circuit board.

7. The array antenna of claim 6, wherein the radiating elements connected to the line patterns of the delay line by the excitation links are carried by the same printed circuit board as that of the delay line.

8. The array antenna of claim 7, wherein at least some of the excitation links each comprise at least one variable coupling element, said variable coupling element having a control input suitable for receiving a coupling intensity signal which is delivered by the control unit, and being arranged to vary an intensity of the electrical excitation signal as received by the radiating element coupled by said excitation link, with respect to the electromagnetic signal as transmitted in the delay line by the line pattern coupled by the same excitation link.

9. The array antenna of claim 7, wherein each radiating element comprises at least one metalized or metallic surface element, which is coupled by an uninterrupted electrical connection or remotely coupled by electromagnetic interaction to the corresponding line pattern, so as to form the excitation link between said radiating element and said line pattern.

10. The array antenna of claim 6, wherein the delay line is formed by a coplanar printed circuit technology in which an electrical signal carrier track and an electrical ground track are formed in a same metalized surface.

11. The array antenna of claim 6, wherein at least some of the excitation links each comprise at least one variable coupling element, said variable coupling element having a control input suitable for receiving a coupling intensity signal which is delivered by the control unit, and being arranged to vary an intensity of the electrical excitation signal as received by the radiating element coupled by said excitation link, with respect to the electromagnetic signal as transmitted in the delay line by the line pattern coupled by the same excitation link.

12. The array antenna of claim 6, wherein each radiating element comprises at least one metalized or metallic surface element, which is coupled by an uninterrupted electrical connection or remotely coupled by electromagnetic interaction to the corresponding line pattern, so as to form the excitation link between said radiating element and said line pattern.

13. The array antenna of claim 1, wherein at least some of the excitation links each comprise at least one variable coupling element, said variable coupling element having a control input suitable for receiving a coupling intensity signal which is delivered by the control unit, and being arranged to vary an intensity of the electrical excitation signal as received by the radiating element coupled by said excitation link, with respect to the electromagnetic signal as transmitted in the delay line by the line pattern coupled by the same excitation link.

14. The array antenna of claim 1, wherein each radiating element comprises at least one metalized or metallic surface element, which is coupled by an uninterrupted electrical connection or remotely coupled by electromagnetic interaction to the corresponding line pattern, so as to form the excitation link between said radiating element and said line pattern.

15. The array antenna of claim 14, wherein each radiating element comprises several metalized or metallic surface elements which are superimposed and all coupled to the excitation line of said radiating element, and which have different dimensions so as to produce maximal radiation emission efficiencies for frequency values of the radiation which differ between at least two of the surface elements of a same radiating element.

16. The array antenna of claim 1, wherein a same row of radiating elements is associated with two delay lines, so that each radiating element of the row of radiating elements is coupled to receive a first electrical excitation signal from a line pattern which belongs to a first of said two delay lines, and simultaneously to receive a second electrical excitation signal from another line pattern which belongs to the other of said two delay lines, so that a phase difference between the first and second electrical excitation signals received by a same radiating element determines a polarization of the emission radiation produced by said radiating element.

17. The array antenna claim 1, comprising several juxtaposed rows of radiating elements so as to form a matrix of radiating elements, each row of radiating elements being associated with at least one delay line dedicated to said row of radiating elements so as to form an antenna line separate from the other antenna lines, the array antenna further comprising a phase shifter assembly suitable for transmitting a same signal to be emitted to the feed ends of all the delay lines, in accordance with variable phase shift values individually assigned to the delay lines by the control unit.

18. The array antenna of claim 1, wherein a pitch length of the radiating elements, measured between any two neighboring radiating elements within said array antenna, is less than or equal to a smallest wavelength value within a transmission band of the array antenna, divided by the term $(1+\sin(\square_{max}))$, where $\square_{max}$ is a maximum value of an elevation angle of the antenna pointing.

19. A vehicle, comprising the array antenna of claim 1, which is installed on board said vehicle.

20. The vehicle of claim 19, wherein the vehicle is a land vehicle, a ship, or an aircraft.

* * * * *